Aug. 15, 1950   W. P. ZABEL   2,518,970
METHOD OF MANUFACTURING VAPOR-SUPPLYING CARTRIDGES
Original Filed June 1, 1944   2 Sheets-Sheet 1
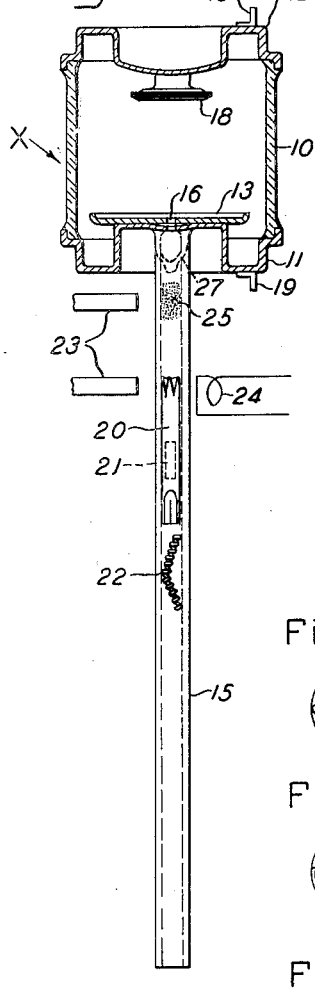
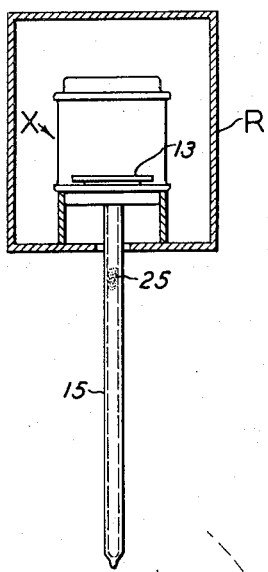
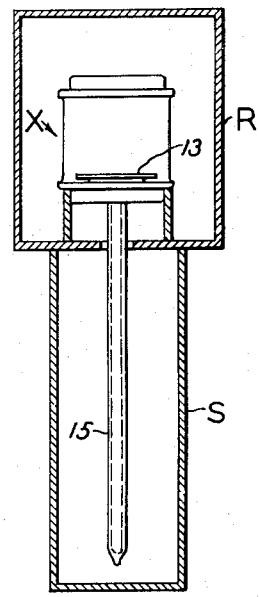
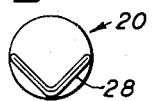
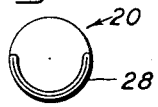
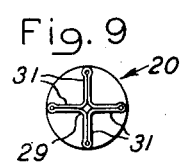
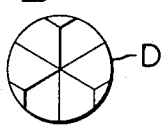
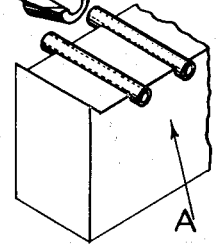
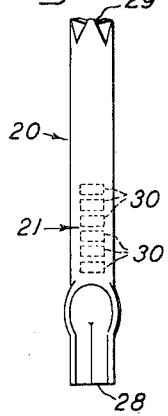
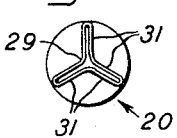
Inventor:
William P. Zabel,
by John H. Anderson
His Attorney.

Aug. 15, 1950 W. P. ZABEL 2,518,970
METHOD OF MANUFACTURING VAPOR-SUPPLYING CARTRIDGES
Original Filed June 1, 1944 2 Sheets-Sheet 2
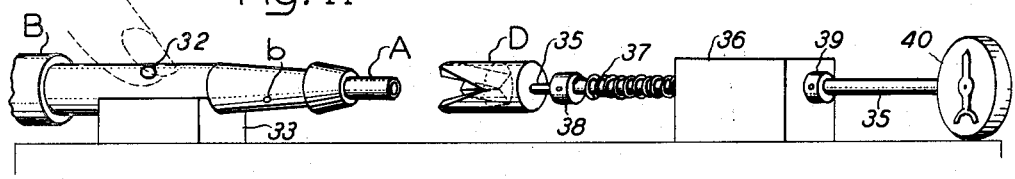
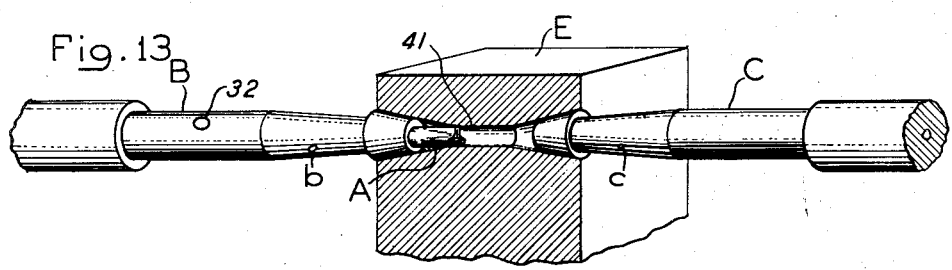
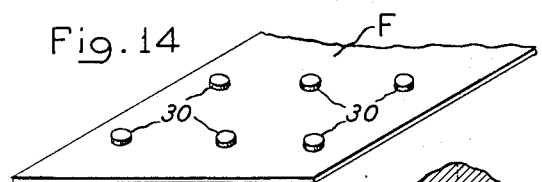
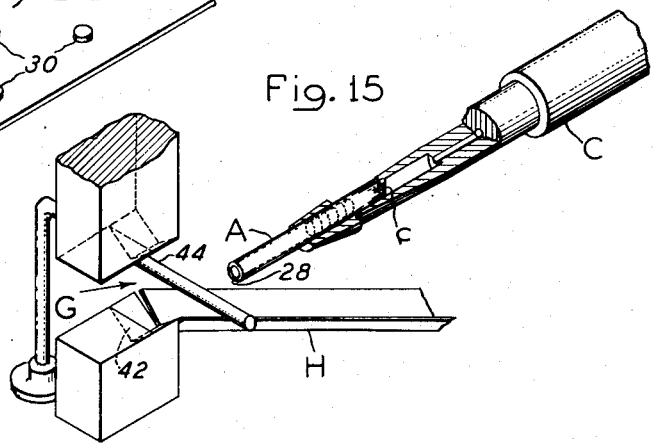
Inventor:
William P. Zabel,
by John H Henderson
His Attorney.

Patented Aug. 15, 1950

2,518,970

UNITED STATES PATENT OFFICE 2,518,970

METHOD OF MANUFACTURING VAPOR-SUPPLYING CARTRIDGES

William P. Zabel, Cleveland Heights, Ohio, assignor to General Electric Company, a corporation of New York Original application June 1, 1944, Serial No. 538,262. Divided and this application November 30, 1946, Serial No. 713,347

2 Claims. (Cl. 226—19)

1

This invention relates to a method of manufacturing vapor-supplying cartridges, the present application being a division of my application Serial No. 538,262, filed June 1, 1944, now Patent No. 2,445,706, issued July 20, 1948.

More particularly, the invention relates to the introduction or liberation of vaporous or finely divided material in envelopes of electrical devices, and is hereinafter explained with particular reference to the activation of electrodes of electric discharge devices, and especially to activation effected by matter in vaporous or suspended form that is introduced or liberated into a discharge device envelope to come in contact with an electrode to be activated. The liberation of such matter may take place after the initial evacuation of the discharge envelope, and matter thus disseminated in the envelope may also serve the purpose of a getter to clean up residual gas or vapor and improve the vacuum. The invention is here described in detail as applied to the manufacture of a simple type of photocell having a cathode surfaced with an antimony and caesium combination; but it will be understood that it is applicable to other types of discharge devices, such as electron multipliers, for example, as well as to other types of phototube besides those here illustrated. Likewise, it is applicable to electrodes surfaced with other combinations besides antimony and caesium, such as bismuth and caesium, antimony and rubidium, or any useful combinations of vaporizable first group metal with metal of the fifth group of the periodic system.

The invention relates particularly to the manufacture and charging of novel cartridges or capsules charged with material for supplying the matter to be liberated in the discharge device envelope, such as caesium or other vaporizable first group or alkali metal, and which may be made of thin walled metal tubing, seamless, welded, or of sheet metal strip with edges butted, lapped or crimped together without welding or brazing. Various features and advantages of the invention will become apparent from the description of species and forms of embodiment, and from the drawings.

In the drawings, Fig. 1 shows a vertical longitudinal section through a photocell device having my novel cartridge in its appendix or exhaust tube; and Figs. 2 and 3 are diagrammatic sectional views of ovens for processing photocells with my cartridge.

Fig. 4 is an oblique side view of the cartridge; Figs. 5 and 6 are end views of the cartridge, show-

2 ing different forms of end closure; Fig. 7 is a tilted view of a pellet for charging or loading the cartridge; and Figs. 8 and 9 are end views showing different forms of reduced vent opening.

Fig. 10 is a tilted or perspective view illustrating a stage in the fabrication of the cartridge; Fig. 11 is an oblique side view illustrating a succeeding stage, and Fig. 12 is an end view of one of the parts shown in Fig. 11; Fig. 13 is a tilted view showing a later stage; Fig. 14 is a tilted or perspective view of pellets for loading a cartridge, conveniently arranged for being picked up into it by suction; and Fig. 15 is a tilted or perspective view illustrating the closure of the cartridge after loading.

A photocell device X is shown in Fig. 1 as comprising a short glass envelope tube 10 having its ends sealed by fusion to the margins of abutting annularly embossed discs or electrode headers 11, 12 of sheet metal (such as chrome iron or "Allegheny 55," as it is commercially known), generally similar to those used for the ends of the tubular incandescent lamps which are commercially known as "Lumiline" lamps. The cathode header 11 which appears at the bottom in Fig. 1 carries a coaxial sheet metal cathode disc 13 (as of Nichrome or nickel) welded thereto and shown with its outer edge turned up toward the anode header 12. As shown, a glass appendix or exhaust tube 15 is attached or sealed by fusion to the outer side of the centrally apertured header 11, substantially coaxial with its aperture and with a corresponding central opening 16 in the disc 13. The anode header 12 which appears at the top in Fig. 1 is not apertured, but carries a central sheet metal part 18 (as of nickel foil) that presents a substantially flat surface toward the cathode 13. Current connections 19, 19 are shown welded to the headers 11, 12.

In the manufacture of the photocell device above described, the cathode disc 13 is welded to the header 11, and the tube 10 is sealed at one end to this header, the cathode disc 13 is surfaced with a thin coating of antimony thermally deposited thereon, the metal part 18 is welded to the header 12, and the header is sealed to the end of the tube 10, the glass tube 15 being also sealed to the header 11.

As shown in Fig. 1, the metal cartridge or capsule 20 of my invention, containing a caesium-yielding charge 21, is placed in the tube 15 somewhat below the cell X. To assure that the capsule 20 shall remain in the desired position in the tube 15, a fixed support may be provided for it, such as a stiff helical (nickel) wire coil spring 22 bent crooked and then inserted in the tube 15 to the position desired, where it is held by its resilient pressure and friction against the tube walls, without obstructing the passage through the tube.

In processing a cell X with the cartridge 20 in the tube 15 as above described, the device may first be baked and exhausted in an oven (not shown), as in the old process, being thus brought to a temperature of the order of 300 to 340° C. The device having come hot out of this exhaust oven, jet(s) of cooling air from one or more nozzles 23 may be blown on the tube 15 to cool it, especially around and above the capsule 20; and while the tube 15 is being thus cooled, the capsule 20 and its charge 21 may be heated by high-frequency induction, by means of a coil 24 placed close to the tube 15 opposite the upper end of the capsule 20, thus flashing the charge 21 and depositing condensed caesium in the tube 15 above the capsule 20, as indicated by stippling at 25, without its entering the cell X to any material extent, and without heating the tube 15 sufficiently to risk cracking it. The tube 15 may then be sealed or tipped off long at 26 as shown in Fig. 2. The caesium being thus in the tube 15 at some distance below the photocell X, the cathode 13 may then be activated by driving a sufficient amount of caesium from the tube 15 up into the cell X, to react with the antimony on the cathode. In preparation for this, the cell X may be placed in an oven R as shown in Fig. 2—with the sealed-off tube 15 extending down through the oven bottom—and heated to a suitably elevated temperature, of the order of some 220° to 260° C., thus bringing the antimony surface at 13 to a temperature at which caesium will rapidly react with it, and also driving any caesium that may have entered the cell X when the charge 21 was flashed down into the tube 15, which remains at room temperature (e. g., 20° C.). The tube 15 may then be heated to vaporize the caesium at 25 and drive it up through the tube 15 and the opening 16 (see Fig. 1) into the cell X, where it deposits on the hot antimony surface of the cathode 13 and at once reacts with the antimony more or less completely. This heating of the tube 15 may be accomplished in a heating zone or enclosure S, which may consist of a separate small oven that can be raised around the tube 15 for the purpose as shown in Fig. 3. Preferably this heating of tube 15 continues long enough to provide a slight surplus of caesium in cell X.

After the tube 15 has been heated in the oven S for the required length of time, the oven S may be removed, to let the tube 15 cool off slightly, whereupon the photocell X may be removed from the oven R and sealed or tipped off from the tube 15 so close that the tip does not project beyond the shelter of the recess in the header 11, as indicated in heavy dotted lines at 27 in Fig. 1. After tipping off, the cells X are baked in an oven (not shown) at a temperature of the order of 180° C. for some 20 minutes, which brings the excess of caesium in each cell X into action as a getter to clean up residual gas, and causes its absorption by internal surfaces of the cell structure. It also tends to stabilize the cells against changes in sensitivity during storage.

The processing of a photocell as just described corresponds to what is disclosed in the application of Clifton G. Found, Serial No. 520,052, filed January 28, 1944, now Patent No. 2,413,442, issued December 31, 1946, and assigned to the assignee of this application. It has been described here as a background for the understanding of my novel cartridge and its use.

As shown in Figs. 1, 4, 5, and 6, the cartridge or capsule 20 consists of a short length of thin-walled seamless sheet metal tubing (as of nickel so thin that it may fairly be termed foil) that contains the charge 21 and has its ends more or less closed at 28, 29 to retain the charge. The tube blanks may preferably be annealed in hydrogen at a temperature of the order of 1100° C. for 10 minutes, to soften and clean them. The charge 21 may consist of material which yields metallic caesium chromate with silicon as a reducing agent. As shown especially in Figs. 1, 4, and 5, the lower end 28 of the tube 20 that rests on the spring 22 is mashed and crimped completely shut in a V-section, though if desired this crimping might be of semicircular or U-section as in Fig. 6. Instead of being in the form of powder, the charge 21 is pelleted into one or more pellets 30 of circular or cylindrical outline somewhat smaller than the bore of the tube 20. While a single pellet or slug of sufficient axial dimension would answer, it is more convenient to employ thin, flat disc-like pellets 30 such as shown in Fig. 7, since this allows of readily varying the total charge 21 by merely varying the number of pellets used. It is desirable, however, in any case, that the charge 21 should occupy substantially less than the whole internal length of the cartridge 20 between its end closures 28, 29.

As shown in Figs. 1 and 4, the upper end 29 of the tube 20 that is directed toward the cell X is not quite closed, but is formed to a narrow vent opening, too narrow to pass either the pellets 30 or their cindered residues after flashing. As shown in Figs. 4 and 8, this tube-end 29 is reduced by mashing and crimping to form a multiplicity of narrow hollow fins or flutes 31, so that the deformed tube section may be termed "stellar" or "cruciform," depending on the number of such hollow fins, three being shown in Fig. 8. While the width and area of vent opening afforded by the hollow fins 31 can generally be made as small as desirable without approaching the practical limit of such deformation of the tube 20, extreme reduction of vent opening can be attained by flattening the fins so that their sides touch, leaving only very small openings at their ends and at their common center, as illustrated in Fig. 9, which shows four such nearly closed-up fins 31. A multifinned or multifluted deformation of the tube end 29 such as described offers the advantage that it does not increase the effective width of the cartridge 20 at this end, and hence cannot interfere with inserting the cartridge in the tube 15, as might be the case if this tube end 29 were merely flattened. The like is also true of the angular or semicircular crimping of the tube end 28 as shown in Figs. 5 and 6. But the stellar or cruciform type of vent opening 31 has an advantage over a V- or U-shaped vent opening in that it is symmetrical and so assures a more uniform distribution of the upward blown metal vapor in the tube 15 and opening 16. As compared with any lateral outlet(s) through the tube wall, the end vent 31 offers the advantage of being aimed directly at the cell inlet 16, so that the vapor enters the cell without being deflected or losing its force.

The compression required to form the alkali-metal yielding material of the charge 21 into cohesive pellets 30 reduces its bulk very considerably as compared with the same material in powder form, so that the cartridge 20 can be made shorter than would otherwise be advantageous. The empty space in the cartridge tube 20 above the charge 21 that is shown in Figs. 1 and 4 is not without importance, however, for while it allows quick heating of the tube wall above the charge by the high-frequency coil, it results in slower and more gradual heating of the charge 21—as the heat travels downward in the thin tube wall—than if the charge were in direct contact with the tube where the latter is directly heated by induction from the coil. Accordingly, the cartridge 20 flashes gently and without any fusion of the metal tube wall. The vapor escapes through the vent opening 31 without danger of rupturing the tube 20 or cracking the tube 15; indeed, the discharge cartridge shows no change in form whatever. The expanded cinders formed by the flashing of the pellets 30 remain in the cartridge, and any cinder fragments are caught in the narrow opening 31, so that "dirty" cells X with "brown spots" of cinder on their cathodes 13 are avoided. Shrinkage in manufacture is reduced because of the improved and uniform performance of the cartridges 20 when flashed, the quality and uniformity of the cells X is improved, and the material and manufacturing costs of the cartridges 20 themselves are very low.

The fabrication and loading of cartridges may be carried out advantageously as illustrated in Figs. 10–15. In Fig. 10, a supply of short annealed lengths of thin-walled nickel tube blanks is represented at A. For a cell X such as shown having a tube 15 of $\frac{3}{32}$ inch internal diameter, tube blanks A of $\frac{1}{16}$ inch diameter with a wall thickness of 0.0025 inch are suitable, and they may be about $\frac{9}{16}$ inch long. It is convenient to work with vacuum pencils B, C (Figs. 10 and 15) having internal bores to just take the tube blanks A easily, with internal stop shoulders such as cross pins $b$, $c$ to limit entrance of the blanks into the pencil to about half the lengths of the blanks more or less, and having suction connections of flexible tubing. Provision for relieving the suction on pencil B is shown as comprising a side hole 32 in pencil B opening into its bore, which hole may be closed by the finger of the operator while the pencil is in use.

Holding the pencils B, C in his left and right hands respectively, the operator first picks up a tube blank A into pencil B, Fig. 10. Resting pencil B on a conformative fixed longitudinal guide 33, he pushes the blank A to the right and endwise into a crimper D (see Figs. 11 and 12) consisting of three 120° steel wedges arranged with their edges converging on a slope, thus deforming and mashing the exposed tube end 29 into three hollow fins 31 as shown in Fig. 8. The width of the tribrach opening 31 thus produced depends on the degree of endwise pressure exerted on the pencil B against the crimper D. As shown in Fig. 11, the crimper D is mounted on a rod 35 slidable through a guide bore in a fixed guide and abutment block 36, and is yieldingly urged to the left by a helical compression spring 37 mounted around the rod and acting between the block 36 and an abutment collar 38 adjustably fixed on the rod, the limit of such movement being determined by engagement of a stop collar 39 adjustably fixed on the rod against the other side of the block. The right-hand end of the rod 35 is arranged to act on a gauge 40 which measures the displacement of the crimper D and hence the force exerted by it on the end of blank A. By observing the reading of gauge 40 closely, the operator can form the tribrach openings 31 perfectly uniform on blank after blank.

The tribrach opening 31 having been thus formed, the operator transfers the half-formed blank A to the other pencil C. This may be done very conveniently by inserting the conical ends of pencils B, C into the oppositely flared ends of a cylindrical bore 41 in an aligning block E, Fig. 13, and relieving the suction in pencil B by removing the finger from side hole 32, whereupon the half-formed blank A will jump across through the bore 41 into pencil C against its stop pin $c$, and the undeformed open end of the blank will be presented and exposed beyond the end of pencil C. The suction in pencil C not only retains the tube blank A, but makes itself felt through the reduced opening 31 and the exposed open end of the blank A, thus enabling the operator to suck up any desired number of the pellets 30 from a supply at F, Fig. 14, into tube blank A. Having done this, the operator lays the exposed end of the tube blank A in the V-grooved anvil of a V-clamper G, Fig. 15, as far as permitted by a stop shoulder 42 on the anvil, and presses down the V-shaped movable upper die of the clamper G to mash the tube end 28 tight shut as shown in Fig. 5, thus completing a loaded cartridge. The operator draws pencil C off of this cartridge while the latter is still held by clamper G, and then raises the movable clamper die. The cartridge rises with the movable die until it is automatically flipped out of the anvil into a chute-trough H by striking a fixed stop-wire 44.

The pellets 30 can be pressed up very rapidly and inexpensively out of the mixture of powdered ingredients, various well-known pelleting machines suitable for the purpose being available.

The cartridge or capsule 20 per se is not claimed herein, but is separately claimed in my parent application Serial No. 538,262 hereinbefore referred to.

What I claim as new and desire to secure by Letters Patent of the United States is:

1. A method of making a loaded cartridge charged with pelleted material yielding vapor when heated, which method comprises forming one end of a sheet metal tube to a vent opening too narrow to pass a pellet of said material; applying suction through said vent opening, and thus drawing the pelleted charge into the tube; and while holding the charge by the suction applied as aforesaid, closing the other end of the tube.

2. A method of making a loaded cartridge charged with pelleted material yielding vapor when heated, which method comprises forcing the tube endwise amongst the edges of convergent spaced wedges and thus crimping one end thereof to a narrow multifluted vent opening; applying suction through said vent opening, and thus drawing the pelleted charge into the tube; and while holding the charge by the suction applied as aforesaid, crimping the other end of the tube shut.

WILLIAM P. ZABEL.

REFERENCES CITED

The following references are of record in the file of this patent:

UNITED STATES PATENTS

| Number | Name | Date |
|---|---|---|
| 378,976 | Richie | Nov. 6, 1888 |
| 2,381,454 | Huth | Aug. 7, 1945 |